(12) United States Patent
Rajala

(10) Patent No.: US 12,162,485 B2
(45) Date of Patent: Dec. 10, 2024

(54) PHYSICS-BASED ACCELERATION CONTROL NODE

(71) Applicant: EMBARK TRUCKS INC., San Francisco, CA (US)

(72) Inventor: Sami Rajala, San Francisco, CA (US)

(73) Assignee: EMBARK TRUCKS INC., San Francisco, CA (US)

( * ) Notice: Subject to any disclaimer, the term of this patent is extended or adjusted under 35 U.S.C. 154(b) by 0 days.

(21) Appl. No.: 18/089,079

(22) Filed: Dec. 27, 2022

(65) Prior Publication Data

US 2024/0208497 A1 Jun. 27, 2024

(51) Int. Cl.
*B60W 30/14* (2006.01)
*B60W 10/196* (2012.01)
(Continued)

(52) U.S. Cl.
CPC ........ *B60W 30/143* (2013.01); *B60W 10/196* (2013.01); *B60W 40/105* (2013.01); *B60W 40/107* (2013.01); *B60W 40/11* (2013.01); *B60W 40/13* (2013.01); *B60W 2300/145* (2013.01); *B60W 2520/105* (2013.01); *B60W 2520/16* (2013.01); *B60W 2530/10* (2013.01);
(Continued)

(58) Field of Classification Search
CPC ............. B60W 30/143; B60W 10/196; B60W 40/105; B60W 40/107; B60W 40/11; B60W 40/13; B60W 2300/145; B60W 2520/105; B60W 2520/16; B60W 2530/10; B60W 2540/10; B60W 2710/0666; B60W 2710/182
See application file for complete search history.

(56) References Cited

U.S. PATENT DOCUMENTS 4,843,553 A * 6/1989 Ohata .................. B60K 31/047
123/352
6,098,007 A    8/2000 Fritz
(Continued)

FOREIGN PATENT DOCUMENTS

EP           945320 B1 *  7/2006  ............ B60T 8/1755
EP          3500965 B1     5/2020
KR       20120107663 A    10/2012

OTHER PUBLICATIONS

EP-0945320-B1 translation (Year: 2006).*
(Continued)

*Primary Examiner* — Kyle T Johnson
(74) *Attorney, Agent, or Firm* — McDermott Will & Emery LLP

(57) ABSTRACT

Provided is a system and method for imitating control signals from physical input mechanisms of a vehicle. Examples of such physical input mechanisms include a gas pedal, a brake pedal, and the like. In one example, the method may include receiving an acceleration value from a planning system associated with a vehicle and a state of the vehicle from a state estimation system, converting, via a software control node, the acceleration value and the state of the vehicle into at least one of an engine torque value and a brake pressure value, generating a control signal for controlling a speed of the vehicle based on the at least one of the engine torque value and the brake pressure value, and transmitting the control signal to a control system of the vehicle.

18 Claims, 13 Drawing Sheets

(51) Int. Cl.
    *B60W 40/105*     (2012.01)
    *B60W 40/107*     (2012.01)
    *B60W 40/11*     (2012.01)
    *B60W 40/13*     (2012.01)

(52) U.S. Cl.
    CPC . *B60W 2540/10* (2013.01); *B60W 2710/0666* (2013.01); *B60W 2710/182* (2013.01)

(56) References Cited

U.S. PATENT DOCUMENTS

| | | | |
|---|---|---|---|
| 11,465,641 B1 | 10/2022 | Agyeman et al. | |
| 2008/0027614 A1* | 1/2008 | Field | B60W 10/109 701/60 |
| 2013/0096808 A1* | 4/2013 | DeLaSalle | B60W 10/06 701/110 |
| 2016/0082964 A1* | 3/2016 | Chunodkar | B60W 40/13 701/70 |
| 2016/0318509 A1* | 11/2016 | Rycroft | B60T 8/1755 |
| 2017/0074193 A1 | 3/2017 | White et al. | |
| 2020/0057453 A1* | 2/2020 | Laws | G08G 1/22 |
| 2020/0231153 A1* | 7/2020 | Yokota | B60T 7/122 |
| 2020/0324763 A1* | 10/2020 | Switkes | G08G 1/161 |
| 2021/0179090 A1* | 6/2021 | Kumazawa | B60W 40/105 |
| 2022/0126799 A1* | 4/2022 | Arikere | B60T 8/17636 |
| 2022/0306107 A1* | 9/2022 | Ravichandran | B60W 10/11 |
| 2022/0355812 A1* | 11/2022 | Jany-Luig | B60W 30/188 |
| 2023/0001955 A1* | 1/2023 | Switkes | B60W 60/0011 |

OTHER PUBLICATIONS

International Search Report and Written Opinion for International Patent App. No. PCT/US2023/086001, mailed May 1, 2024 (10 pages).

* cited by examiner

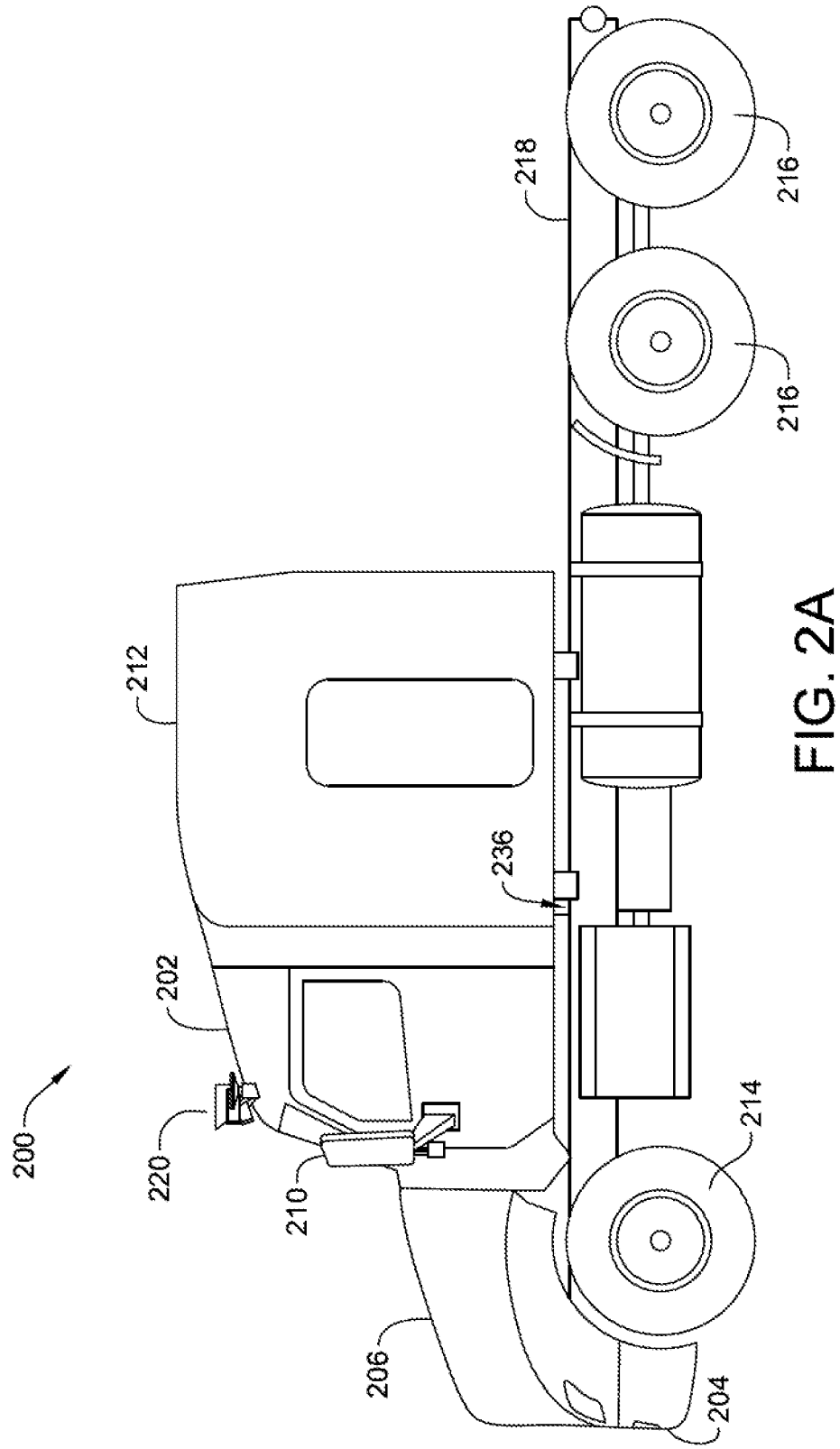

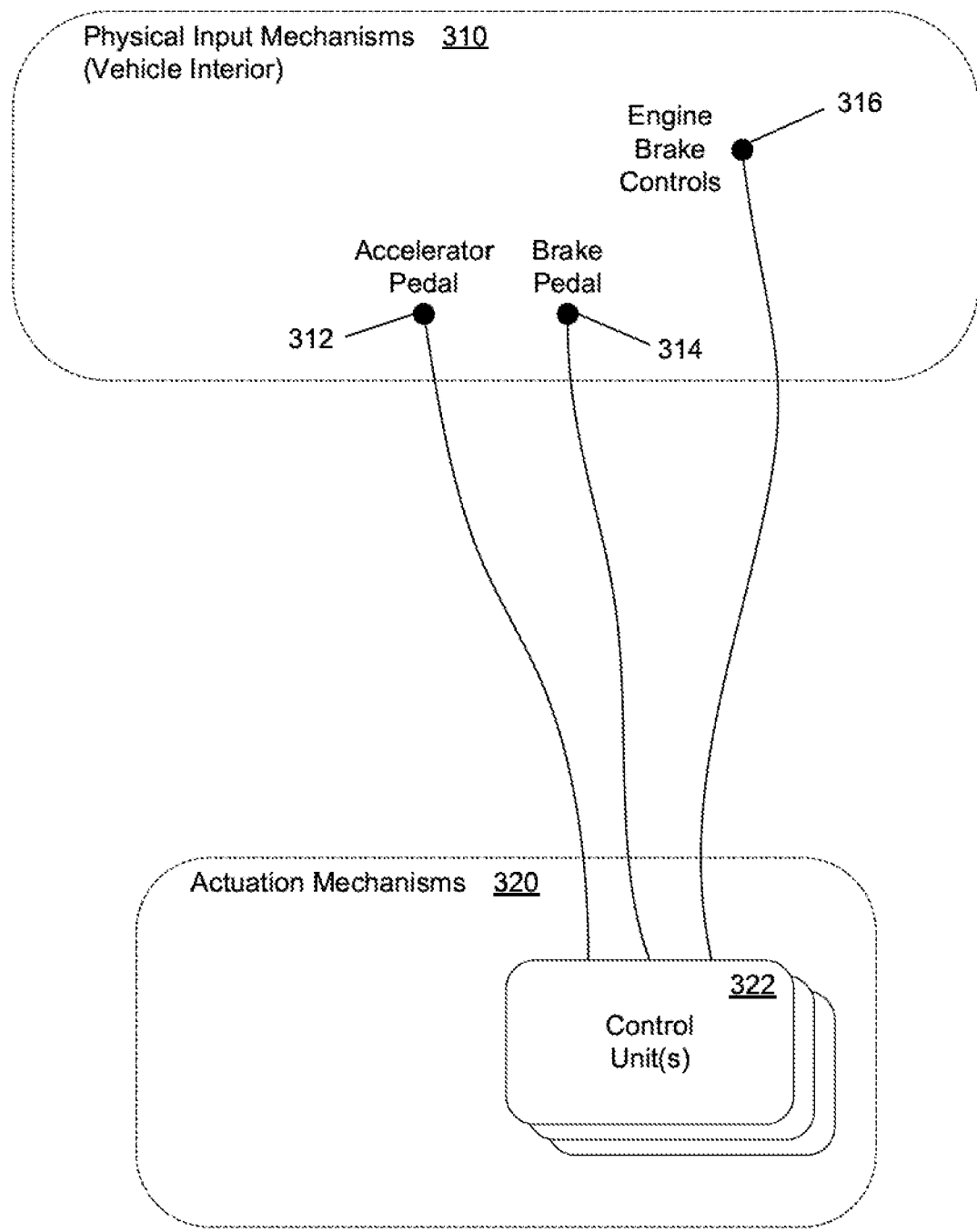

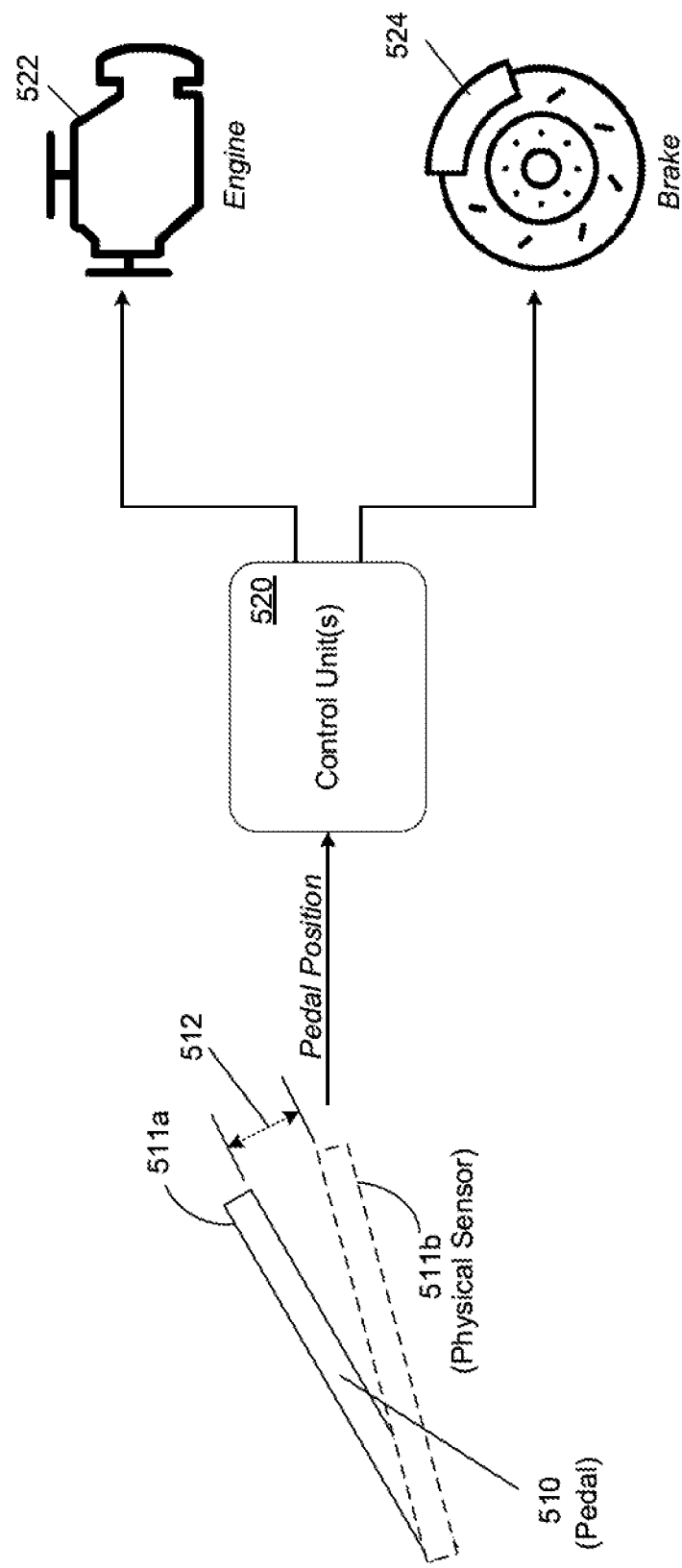

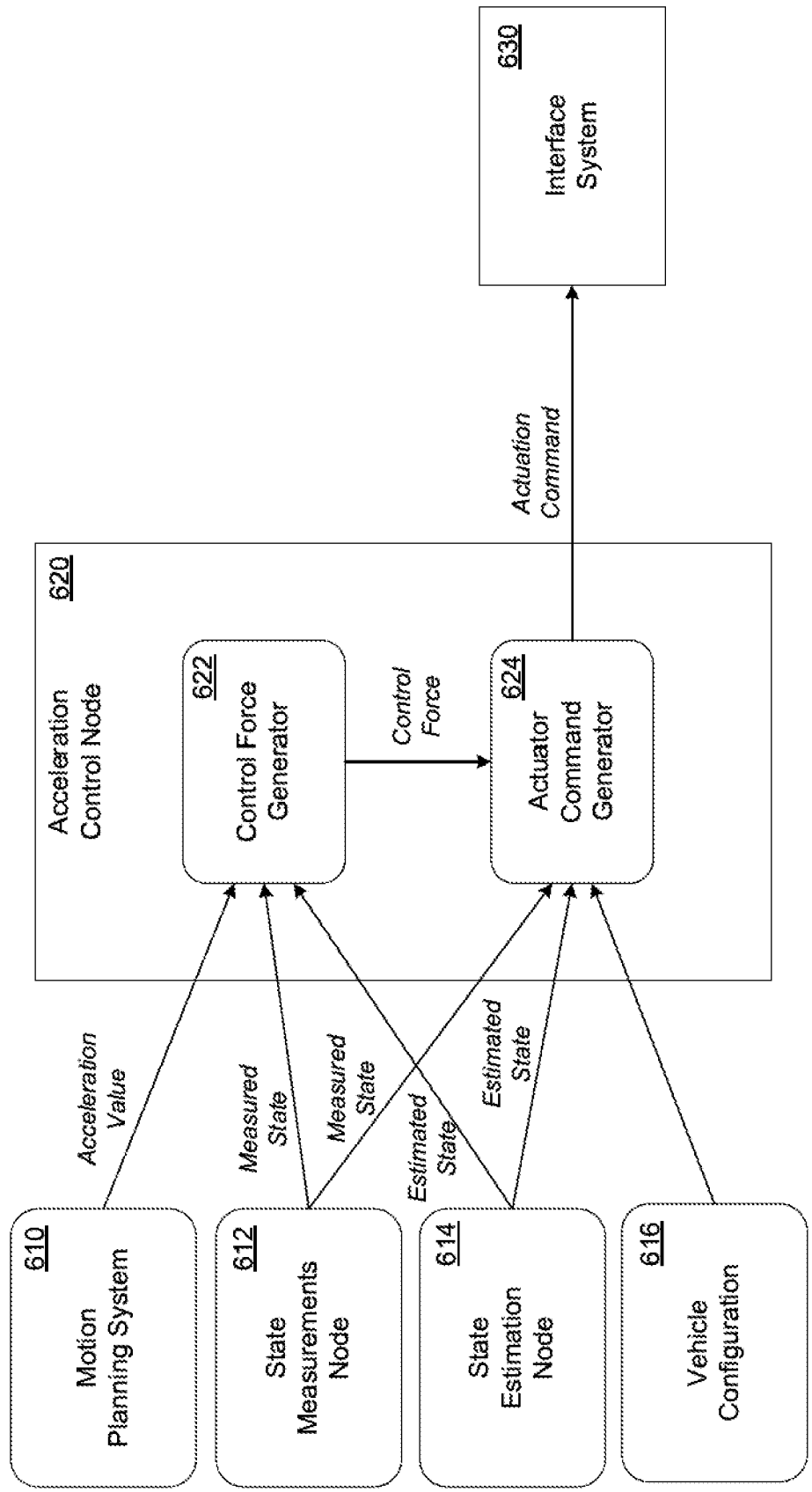

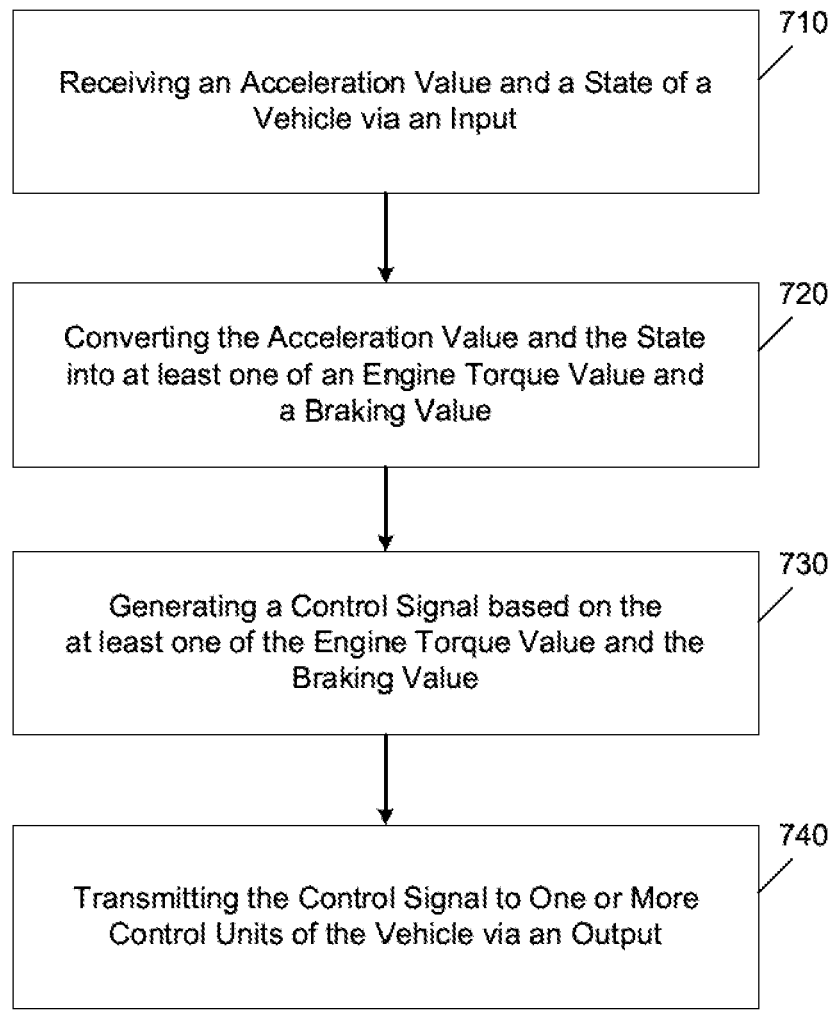

PHYSICS-BASED ACCELERATION CONTROL NODE

BACKGROUND

When a user presses on the accelerator pedal of a vehicle, a sensor captures the pedal position and sends the captured pedal position to an engine control unit which modulates the engine output of the vehicle based on the pedal position. For example, the engine control unit may determine an amount of torque and apply the amount of torque to the engine. Furthermore, a transmission control unit receives the pedal position and automatically adjusts gear settings of the vehicle based on the pedal position.

Meanwhile, an autonomous vehicle does not physically depress an accelerator pedal (or a brake pedal) to cause the vehicle to move (or stop). Instead, the autonomous vehicle's computer sends an instruction to the engine control unit which controls the output of the engine. For example, the instruction may identify a desired torque for the vehicle and the engine control unit may increase the output of the engine until the desired torque is achieved.

While driving a vehicle manually, a driver may adjust their control inputs such as a throttle pedal or brake amount based on her knowledge or observations of the physical properties of the truck and the world around them. For instance if the vehicle is a fully loaded semi-truck, the driver may press the accelerator pedal harder for a small acceleration than for a vehicle with a lighter load. Similar concepts can be applied to the control of autonomous vehicles to improve the performance of the controls. However, traditionally this would require a complicated tuning process for different vehicle configurations. The tuning process may further be complicated by the automated transmission of the semi-truck that may shift gears at different shift-points during autonomous driving than during manual driving if the control inputs to the vehicle are not the same during the manual driving and autonomous driving.

SUMMARY

The example embodiments are directed to an acceleration control node that is included within an autonomous vehicle and that can create a control signal for controlling an input to an engine or a braking system of a vehicle without the need for a pedal. The acceleration control node is a software component that may be installed within the vehicle and which is capable of controlling the desired speed (or braking) of a vehicle in comparison to a traditional accelerator pedal (or brake pedal). For example, the acceleration control node may convert an engine torque value (number) received from the vehicle's computer into a physical displacement value (pedal position, etc.) that can be used to actuate the engine of the vehicle. Furthermore, the content within the control signal may match the content that is normally transmitted from an acceleration sensor associated with the pedal. Therefore, the control unit of the vehicle interprets the control signal as if a human was actually pressing on the pedal. In doing so, the example embodiments use software to overcome the drawback in the related art that require the tuning process. The tuning process is not needed here because the control unit(s) receive values from the acceleration control node that they are familiar with and can interpret correctly without the need for much tuning.

As noted, the acceleration control node may be a software program that is installed within an autonomous vehicle (AV) system that is part of the vehicle's computer and that is used for planning and route guidance. The acceleration control node may feed an input signal to an interface system such as described in U.S. patent application Ser. No. 17/457,946, filed on Dec. 7, 2021, in the United States Patent and Trademark Office, the entire disclosure of which is incorporated herein by reference for all purposes.

The interface system, (also referred to herein as a universal interface) can be used to imitate or otherwise mimic signals from various physical input mechanisms of a vehicle which can be used to control other components of the vehicle. The physical input mechanisms may include an accelerator pedal, a brake pedal, a turn-signal stalk, a button on the dashboard, steering wheel, console, etc.) The interface system may create and output signals that mimic or otherwise imitate signals from the physical input mechanisms. These control signals can be used to control the corresponding physical components of the vehicle that the physical input mechanism typically control. Therefore, the system disclosed herein improves upon the state of the art by providing improved control signaling to a vehicle thereby improving vehicle response.

In order for the interface system to control the actuators of the engine and/or the braking system of the vehicle, the interface system needs an input that provides an engine torque or a braking pressure. In the example embodiments, the acceleration control node may create or otherwise determine an engine torque value or a brake pressure value to be used by the interface system and feed this value to the interface system when the interface system is in the process of generating a control signal that is set to mimic a physical input mechanism such as an accelerator pedal or a brake pedal. To do this, the acceleration control node may rely on a physics-based model which receives state information and the acceleration value as input, and generates an engine torque value (i.e., speed up) or a brake pressure value (i.e., slow down).

In the example embodiments, the acceleration control node may use a physics-based model that may be predefined in advance or may be dynamically generated, which converts an acceleration value, such as provided from a planning system of the autonomous vehicle, into an engine torque value or a brake pressure value depending on whether the acceleration control node determines there is a need to slow down or speed up the vehicle. The decision by the acceleration control node can also be based on state information of the vehicle, such as a current speed, a location of the vehicle on the road, other vehicles sensed around the vehicle, objects in the road, and the like. This state information can be used by the physics-based model when determining the proper engine torque value or brake pressure value.

For example, the acceleration control node may receive a trigger or other request to speed up from the vehicle's computer, such as the planning system or the like, and in response, generate an engine torque value. The request may include an acceleration value therein that is created by the vehicle's computer and that is the desired acceleration for the vehicle. Here, the physics-based model may generate the engine torque value based on a state of the vehicle and the acceleration value from the vehicle's computer. The engine torque value may be submitted to the interface system which translates the engine torque value into a pedal position (displacement value) that would ordinarily be sensed by a vehicle sensor associated with the accelerator pedal. The interface system may generate a signal that imitates a reading from the accelerator pedal sensor, and the like. In some embodiments, the interface system may include multiple interfaces (e.g., mounting harnesses) for easily connecting to wiring harnesses of various components of the vehicle such as the accelerator pedal, the brake pedal, the turn signal stalk, the engine control unit, a controller area network (CAN) bus, and the like.

The acceleration control node may be embodied within an AV system that also includes an interface for attaching to a wiring harness of the interface system which allows the acceleration control node to send instructions from the vehicle's computer for controlling physical input mechanisms of the vehicle. For example, the vehicle's computer may transmit a request to the acceleration control node to trigger actuation of an air intake of the engine of the vehicle based on a desired engine torque value. In response, the interface system may translate the desire engine torque value into a pedal position value and send the pedal position value to an engine control unit and/or a transmission control unit. In this example, the system may query a table with the desired torque value and/or current engine speed and receive the corresponding pedal position value. If the table does not include an exact match for the torque/pedal position value, the system may perform an interpolation process to interpolate a pedal position value for the requested the torque value based on a similar torque value and its mapped pedal position. Other mechanisms to associate a physical position or input to a control signal are known in the art and covered by the invention disclosed herein.

In the example embodiments, the engine control unit receives the pedal position signal from the system. Here, the engine control unit is unaware of whether the signal is coming from the actual accelerator pedal position sensor or from the system described herein. In response, the engine control unit actuates the engine based on the pedal position value. Likewise, the transmission control unit is capable of finding the proper gear almost immediately based on the pedal position value. Furthermore, if necessary, a "kill" switch to interrupt the computerized control operations can be provided that returns full control of the accelerator pedal (or other physical input mechanism) to its original configuration. In response to the kill signal, the system may disable a connection between the system and the engine control unit and restore a connection between the accelerator pedal sensor and the engine control unit.

Furthermore, the interface system may be used to generate electrical input signals that mimic or otherwise imitate signals of other physical input components of the vehicle such as a brake pedal or a brake actuation system. Here, the interface system may include multiple interfaces for simultaneously connecting to multiple physical input components including both the accelerator pedal and the brake pedal or brake actuation system, as well as others such as a turn signal, headlights, radio, A/C, and the like. Furthermore, the acceleration control node may generate input signals for the interface signal to create the mimicked signal. For example, the acceleration control node may use the physics-based model to determine a brake pressure to apply to a brake actuation system based on the acceleration value in the request and the state information of the vehicle. In this case, the acceleration control node may forward the brake pressure command value to the interface system which sends it to a brake control system which actuates the brakes causing them to apply pressure to the brake circuit of the vehicle and slow down the vehicle.

In addition, different manufacturers (also referred to herein as OEMs) have different control signals, messages, formats, etc. between the physical input mechanisms and the components of the vehicle. The system described herein is "universal" because it provides ports/interfaces and logic that can be used on a vehicle of any type of manufacturer. For example, the system may be programmed with different logic and instructions for each of the different manufacturers. As another example, the system may be dynamically configured for a particular manufacturer. In this case, the system may be designed to work with a particular OEM ahead of time by swapping out a replaceable part on a motherboard of the system.

According to an aspect of an example embodiment, provided is an apparatus that may include a processor configured to receive an acceleration value from a planning system of a vehicle and a state of the vehicle from a state estimation system, convert the acceleration value and the state of the vehicle into at least one of an engine torque value and a braking value, and generate a control signal for controlling a speed of the vehicle based on the at least one of the engine torque value and the braking value, and an output configured to transmit the control signal to a control system of the vehicle. In this context the engine torque value may refer to either an actual torque signal sent directly to the engine or an accelerator pedal position which the engine will interpret to mean a similar torque value based on the engine calibration. Furthermore, a braking value may refer to either a brake pressure value or an engine brake torque value.

According to an aspect of another example embodiment, provided is a method that may include receiving an acceleration value from a planning system of a vehicle and a state of the vehicle from a state estimation system, converting the acceleration value and the state of the vehicle into at least one of an engine torque value and a braking value, generating a control signal for controlling a speed of the vehicle based on the at least one of the engine torque value and the braking value, and transmitting the control signal to a control system of the vehicle.

According to an aspect of another example embodiment, provided is a non-transitory computer-readable medium with instructions which when executed by a processor cause a computer to perform a method that may include receiving an acceleration value from a planning system of a vehicle and a state of the vehicle from a state estimation system, converting the acceleration value and the state of the vehicle into at least one of an engine torque value and a braking value, generating a control signal for controlling a speed of the vehicle based on the at least one of the engine torque value and the braking value, and transmitting the control signal to a control system of the vehicle.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 2A-2C are diagrams illustrating exterior views of a semi-truck that may be used in accordance with example embodiments.

FIG. 3A is a diagram illustrating electrical connections between physical input components of a vehicle in accordance with a related art.

FIGS. 5A-5C are diagrams illustrating a process of controlling a physical input component of a vehicle in accordance with example embodiments.

FIG. 6A is a diagram illustrating a process of an acceleration control node generating an actuation signal for controlling acceleration of a vehicle in accordance with an example embodiment.

FIG. 7 is a diagram illustrating a method for controlling a physical input component of a vehicle in accordance with an example embodiment.

Figure 1:
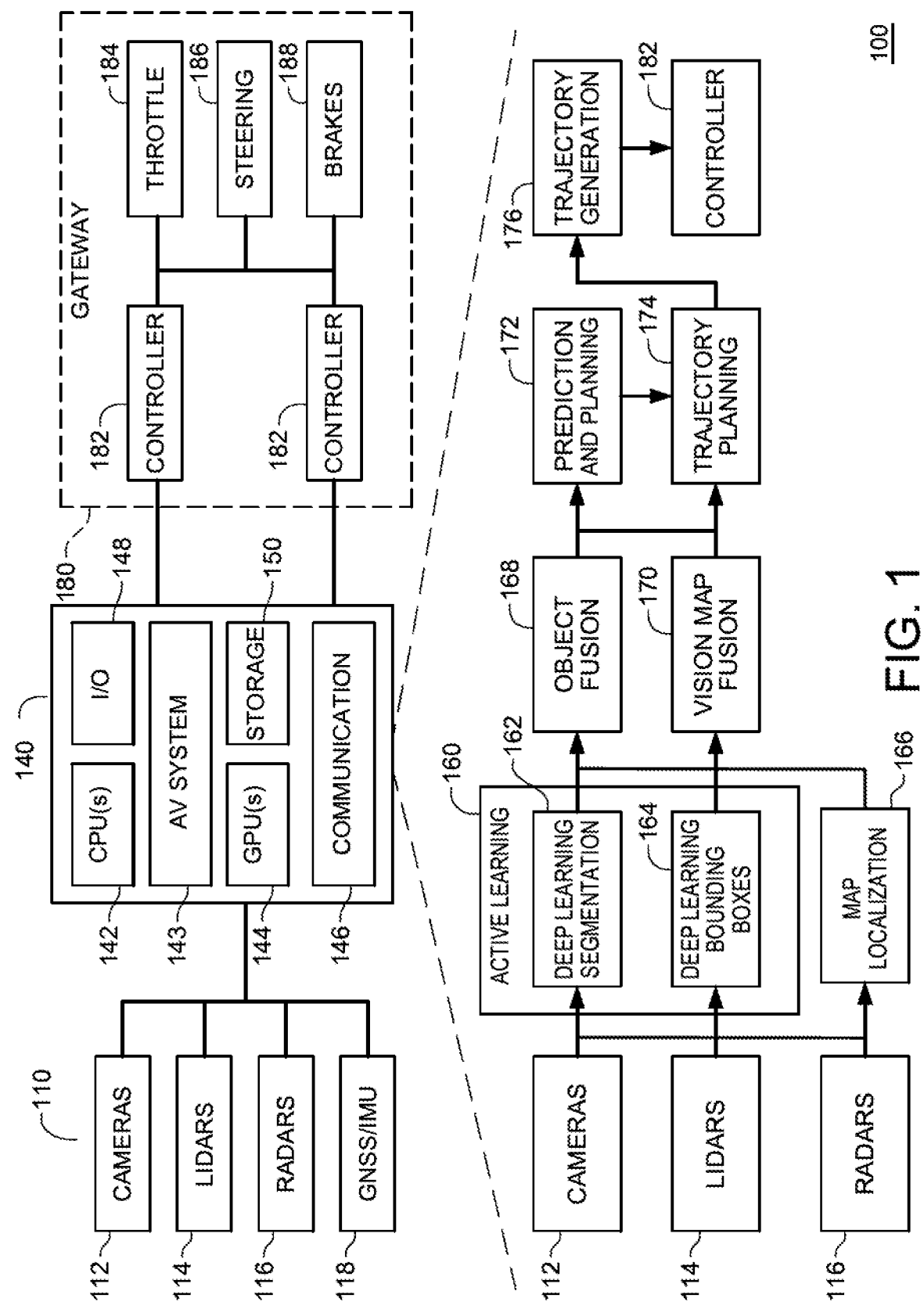
FIG. 1 is a diagram illustrating a control system that may be deployed in a vehicle such as the semi-truck depicted in FIGS. 2A-2C, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein.

Light detection and ranging (lidar) sensors are used by vehicles to measure a surrounding area by obtaining a sparse point cloud using distances to points in the point cloud that are measured by light beams from the lidar sensors. The illumination works independently from ambient light and can be used in any conditions. Furthermore, the lidar sensors can capture data that can be used to generate a map of the world in three-dimensions (3D). Meanwhile, vehicle cameras can capture images (e.g., RGB images, black and white images, etc.) of the world around the vehicle and provide complimentary data to the lidar data captured by the lidar sensors. For example, cameras can capture data such as color, texture, appearance, etc., while lidar is able to capture and model structural aspects of the data.

In many vehicles, the perception of the vehicle is created based on a combination (i.e., jointly) of lidar data from the lidar sensors and image data captured by the cameras. For accurate perception, these two systems must be aligned with respect to each other. Calibration can be performed to align a coordinate frame of a lidar sensor(s) with a coordinate frame of a camera by changing extrinsic parameters such as rotation and translation between the coordinate frames of the lidar sensor and the camera. These extrinsic parameters can be used to fuse information together from the lidar sensors and the image sensors when visualizing the vehicle interprets visual data from the road.

With the calibrated sensors, the vehicle can capture images and lidar readings of the area surrounding the vehicle and build/modify a three-dimensional map that is stored internally within a computer of the vehicle (or remotely via a web server). The vehicle can localize itself within the map and make decisions on how to steer, turn, slow down, etc. based on other objects, lane lines, entrance lanes, exit lanes, etc. within the map. Autonomous vehicles may use one or more computer systems to control the vehicle to move autonomously without user input. For example, the vehicle may be equipped with an autonomous vehicle (AV) system that generates signals for controlling the engine, the steering wheel, the brakes, and the like, based on other objects, lane lines, entrance lanes, and exit lanes, within the map.

However, many features of a vehicle are still be operated (in some cases solely) by a user inputting commands (physical actions) on physical input mechanisms of the vehicle using their hands, feet, etc. For example, headlights, accelerator pedals, brake pedals, turn signals, input buttons, and the like, are examples of physical input mechanisms that can be used to control parts of the vehicle. For example, a user may use their hand to turn a stalk next to the steering wheel to turn on the headlights or actuate a turn signal. As another example, a human may use their foot to press on an accelerator pedal to cause the engine to speed-up, and likewise use their foot to press on a brake pedal to cause the braking system to be applied and the vehicle's wheels to slow down.

The example embodiments are directed to an interfacing system (interface system) that can generate control signals for these physical input mechanisms that mimic or otherwise imitate the actuation signals created by the physical input mechanisms, and thereby electrically control the corresponding physical components of the vehicle based on instructions from the vehicle's computer rather than a user physically inputting commands inside the vehicle. The system may be referred to herein as an interface system, a universal interface, or the like. The system may comprise a housing that holds a motherboard, circuit components (e.g., processor, resistor module, etc.) installed therein, and the like. Furthermore, the motherboard may comprise interfaces that enable the system to physically connect to various components of the vehicle. For example, the interfaces may include, but are not limited to, mounting harnesses, ports, cables, etc. or other attachment means for receiving and connecting to wires (e.g., wire harnesses) of other components of the vehicle. For example, the system may be electrically connected/attached into the wiring of the vehicle (e.g., to a wire harness of the physical input mechanism and to a wire harness of a control unit for controlling the corresponding physical component).

According to various embodiments, the system may disable or otherwise block a signal from the physical input mechanism from being used to control/actuate the physical input mechanism and instead replace the signal from the physical input mechanism with a signal from the control signal that is triggered by the vehicle's computer. For example, the system may be connected to the vehicle's AV system which may be integrated within the vehicle's computer and which can send requests or instructions to the system to cause the system to imitate a physical input by a user on a physical input mechanism of a vehicle component.

In some of the examples herein, the vehicle is illustrated as a semi-truck. However, it should be appreciated that the example embodiments are applicable to any kind of autonomous vehicle and not just trucks or semi-trucks but instead may include cars, boats, tractors, motorcycles, and the like, as well as trucks of all kinds.

Figure 2B:
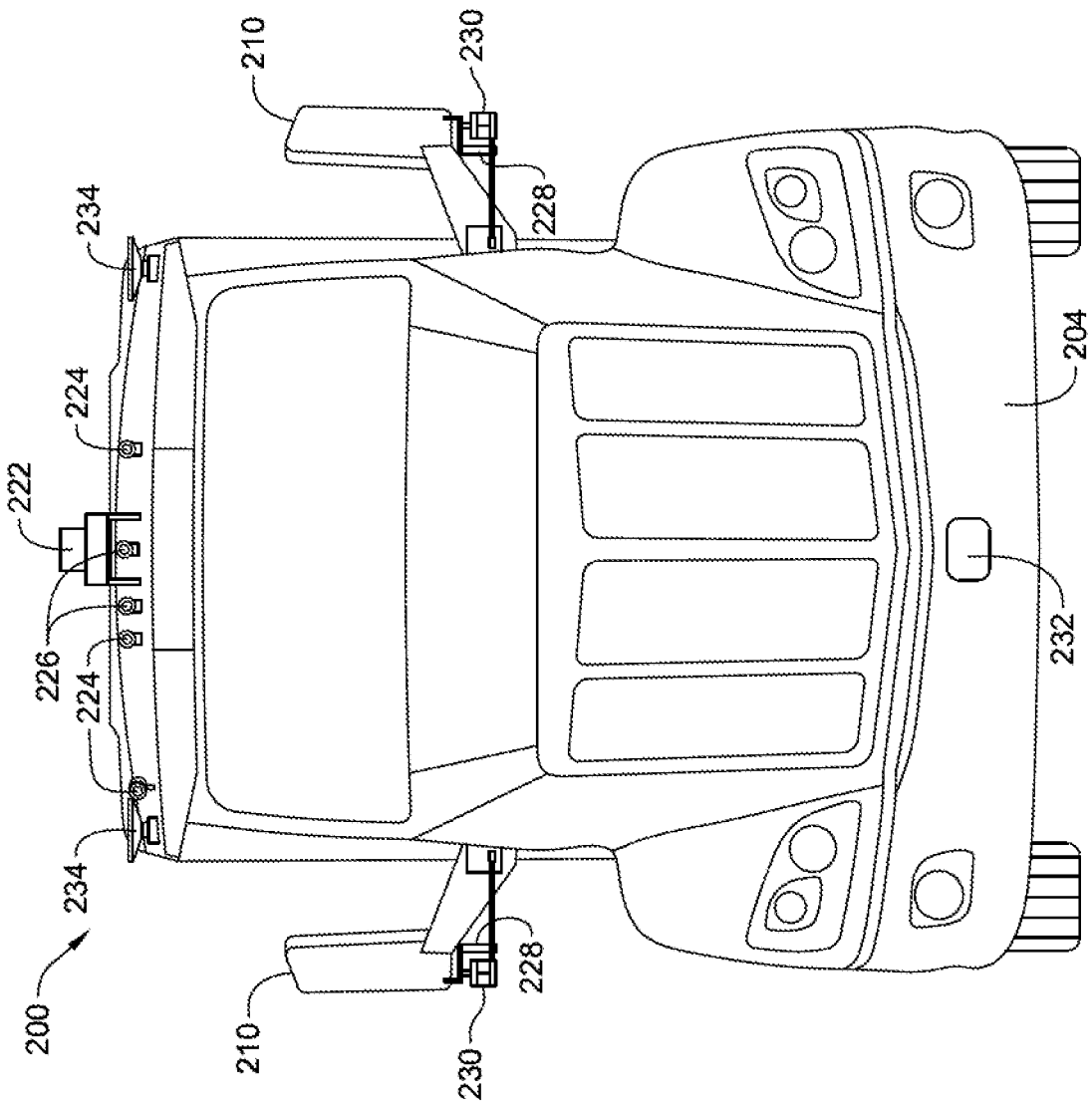
Figure 2C:
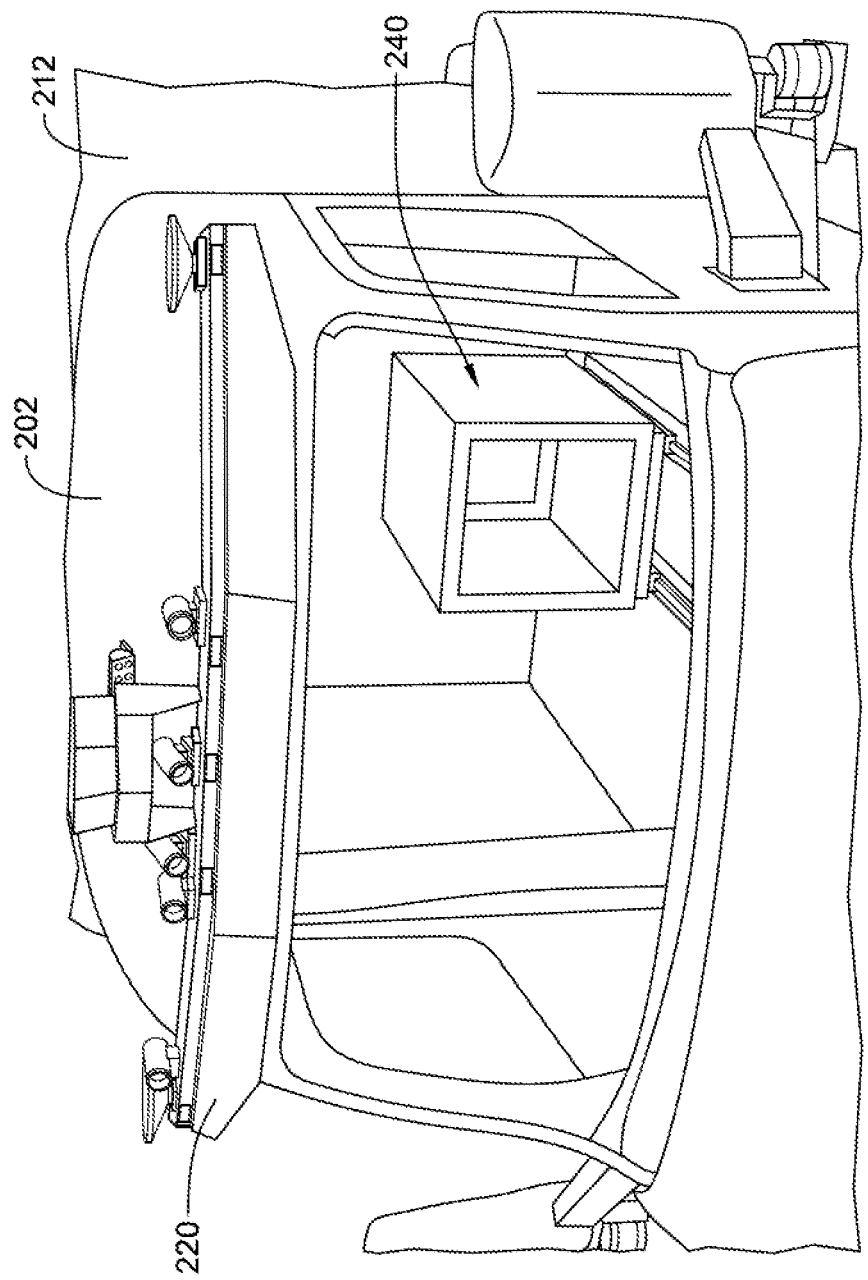

FIG. 1 illustrates a control system 100 that may be deployed in a vehicle such as the semi-truck 200 depicted in FIGS. 2A-2C, in accordance with an example embodiment. Referring to FIG. 1, the control system 100 may include a number of sensors 110 which collect data and information provided to a computer system 140 to perform operations including, for example, control operations which control components of the vehicle via a gateway 180. Pursuant to some embodiments, the gateway 180 is configured to allow the computer system 140 to control a number of different components from different manufacturers.

The computer system 140 may be configured with one or more central processing units (CPUs) 142 to perform processing including processing to implement features of embodiments of the present invention as described elsewhere herein as well as to receive sensor data from sensors 110 for use in generating control signals to control one or more actuators or other controllers associated with systems of the vehicle (including, for example, actuators or controllers allowing control of a throttle 184, steering systems 186, brakes 188 or the like). In general, the control system 100 may be configured to operate the semi-truck 00 in an autonomous (or semi-autonomous) mode of operation. In some embodiments, the computer system 140 may include an AV system 143 for controlling the system that is further described herein with respect to FIGS. 3, 4, 5A-5C, and 6. For example, the AV system 143 may be installed within the computer system 140.

In operation, the control system 100 may be operated to capture images from one or more cameras 112 mounted on various locations of the semi-truck 200 and perform processing (such as image processing) on those images to identify objects proximate or in a path of the semi-truck 200. Further, lidar 114 and radar 116 sensors may be positioned to sense or detect the presence and volume of objects proximate or in the path of the semi-truck 200. Other sensors may also be positioned or mounted on various locations of the semi-truck 200 to capture other information such as position data. For example, the sensors may include one or more satellite positioning sensors and/or inertial navigation systems such as GNSS/IMU 118. A Global Navigation Satellite System (GNSS) is a space-based system of satellites that provide the location information (longitude, latitude, altitude) and time information in all weather conditions, anywhere on or near the Earth to devices called GNSS receivers. GPS is the world's most used GNSS system. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 118 sensors may be used in conjunction with features of the present invention.

The data collected by each of these sensors may be processed by the computer system 140 to generate control signals that control the operation of the semi-truck 200. The images and location information may be processed to identify or detect objects around or in the path of the semi-truck 200 and control signals may be emitted to adjust the throttle 184, steering 186 or brakes 188 as needed to safely operate the semi-truck 200. While illustrative example sensors and actuators or vehicle systems are shown in FIG. 1, those skilled in the art, upon reading the present disclosure, will appreciate that other sensors, actuators or systems may also be used. For example, in some embodiments, actuators to allow control of the transmission of the semi-truck 200 may also be provided.

The control system 100 may include a computer system 140 (such as a computer server) which is configured to provide a computing environment in which one or more software or control applications (such as items 160-182) may be executed to perform the processing described herein. In some embodiments, the computer system 140 includes components which are deployed on a semi-truck 200 (e.g., they may be deployed in a systems rack 240 positioned within a sleeper compartment 212 as shown in FIG. 2C). The computer system 140 may be in communication with other computer systems (not shown) that may be remote from the semi-truck 200 (e.g., the computer systems may be in communication via a network connection).

In some examples, the computer system 140 may be implemented as a server.

Furthermore, the computer system 140 may configured using any of a number of well-known computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

A number of different software applications or components may be executed by the computer system 140 and the control system 100. For example, as shown, applications may be provided which perform active learning machine processing (active learning component 160) to process images captured by one or more cameras 112 and information obtained by lidar 114. For example, image data may be processed using deep learning segmentation models 162 to identify objects of interest in those images (such as, for example, other vehicles, construction signs, etc.). Lidar data may be processed by the machine learning applications 164 to draw or identify bounding boxes on image data to identify objects of interest located by the lidar sensors. Information output from the machine learning applications may be provided as inputs to object fusion 168 and vision map fusion 170 software components which may perform processing to predict the actions of other road users and to fuse local vehicle poses with global map geometry in real-time, enabling on-the-fly map corrections. The outputs from the machine learning applications may be supplemented with information from Radars 116 and map localization 166 application data (as well as with positioning data). These applications allow the control system 100 to be less map reliant and more capable of handling a constantly changing road environment. Further, by correcting any map errors on the fly, the control system 100 can facilitate safer, more scalable and more efficient operations as compared to alternative map-centric approaches. Information is provided to prediction and planning application 172 which provides input to trajectory planning 174 components allowing a trajectory 176 to be generated in real time based on interactions and predicted interactions between the semi-truck 200 and other relevant vehicles in the environment. In some embodiments, for example, the control system 100 generates a sixty second planning horizon, analyzing relevant actors and available trajectories. The plan that best fits multiple criteria (including safety, comfort and route preferences) is selected and any relevant control inputs needed to implement the plan are provided to controllers 182 to control the movement of the semi-truck 200.

These applications or components (as well as other components or flows described herein) may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 1 illustrates an example computer system 140 which may represent or be integrated in any of the above-described components, etc. FIG. 1 is not intended to suggest any limitation as to the scope of use or functionality of embodiments of the application described herein. The computer system 140 is capable of being implemented and/or performing any of the functionality set forth hereinabove.

The computer system 140 may be described in the general context of computer system-executable instructions, such as program modules, being executed by a computer system. Generally, program modules may include routines, programs, objects, components, logic, data structures, and so on that perform particular tasks or implement particular abstract data types. The computer system 140 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 140 is shown in the form of a general-purpose computing device. The components of the computer system 140 may include, but are not limited to, one or more processors (such as CPUs 142 and GPUs 144), a communication interface 146, one or more input/output interfaces 148 and the storage device 216. Although not shown, the computer system 140 may also include a system bus that couples various system components including system memory to the CPUs 142. In some embodiments, the input/output interfaces 148 may also include a network interface. For example, in some embodiments, some or all of the components of the control system 100 may be in communication via a controller area network ("CAN") bus or the like. The storage device 150 may include a variety of types and forms of computer readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, storage device 150 can read and write to a non-removable, non-volatile magnetic media (not shown and typically called a "hard drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules that are configured to carry out the functions of various embodiments of the application.

FIGS. 2A-2C are diagrams illustrating exterior views of a semi-truck 200 that may be used in accordance with example embodiments. Referring to FIGS. 2A-2C, the semi-truck 200 is shown for illustrative purposes only—those skilled in the art, upon reading the present disclosure, will appreciate that embodiments may be used in conjunction with a number of different types of vehicles. The example semi-truck 200 shown in FIGS. 2A-2C is one configured in a common North American style which has an engine 206 forward of a cab 202, a steering axle 214 and drive axles 216. A trailer (not shown) is attached to the semi-truck 200 via a fifth-wheel trailer coupling that is provided on a frame 218 positioned over the drive axles 216. A sleeper compartment 212 is positioned behind the cab 202. A number of sensors are positioned on different locations of the semi-truck 200. For example, sensors may be mounted on a roof of the cab 202 on a sensor rack 220. Sensors may also be mounted on side mirrors 210 as well as other locations. As will be discussed, sensors may be mounted on the bumper 204 as well as on the side of the cab 202 or other locations. For example, a rear facing radar 236 is shown as mounted on a side of the cab 202 in FIG. 2A. Embodiments may be used with other configurations of trucks or other vehicles (e.g., such as semi-trucks having a cab over or cab forward configuration or the like). In general, and without limiting embodiments of the present invention, features of the present invention may be used with desirable results in vehicles that carry cargo over long distances, such as long-haul semi-truck routes.

FIG. 2B is a front view of the semi-truck 200 and illustrates a number of sensors and sensor locations. The sensor rack 220 may secure and position several sensors including a long range lidar 222, long range cameras 224, GPS antennas 234, and mid-range front facing cameras 226. The side mirrors 210 may provide mounting locations for rear-facing cameras 228 and mid-range lidar 230. A front radar 232 may be mounted on the bumper 204. Other sensors may be mounted or installed on other locations—the locations and mounts depicted in FIGS. 2A-2C are for illustrative purposes only. Referring now to FIG. 2C, a partial view of the semi-truck 200 is shown which shows an interior of the cab 202 and the sleeper compartment 212. In some embodiments, portions of the control system 100 of FIG. 1 are deployed in a systems rack 240 in the sleeper compartment 212, allowing easy access to components of the control system 100 for maintenance and operation.

The example embodiments are directed to a new piece of technology that has never been created before. The interface system described herein is a hardware system (e.g., a box or other piece of equipment) with a motherboard and various parts embedded therein including adapters (e.g., ports, mounting harness, slots, etc.) for electrically connecting with various mechanical equipment of a vehicle and a processor for controlling the signaling of the system. The system enables a vehicle's computer (e.g., the AV system) to have electronic control over systems that the AV system is not designed to have electronic control over from a third-party system.

Despite advancements in autonomous vehicle technology, many aspects of a vehicle are still designed to be controlled by a human (i.e., a human touch or otherwise physically contacting and manipulating physical input mechanisms). For example, an accelerator pedal or a brake pedal is meant to be depressed by a person using their foot to press on the pedals. Likewise, a stalk for turn signals is meant to be pulled up or down or have dials turned by a hand of a user. Likewise, input buttons such as for cruise control, air conditioning, user interface inputs, hazard lights, etc. are all designed to be manipulated by a user making physical contact with their hand on some sort of physical input mechanism.

The interface system described herein provides the ability for a vehicle's AV system to turn off and on the systems of the vehicle as if a driver were controlling them. The system also allows the vehicle's computer to perform the behavior of a driver within the vehicle so that the vehicle cannot tell if a human or a computer is operating the vehicle. It gives the ability for the electronics system of an autonomous vehicle (AV) to control the vehicle like a human.

The interface system may be physically attached (e.g., using cables, wires, wire harnesses, input ports, mounting harnesses, etc.) to various pieces of equipment/parts of the vehicle such as a brake pedal or a brake actuation device (and its sensors), an accelerator pedal (and its sensors), a stalk on the steering column (and its sensors), and the like. Once attached to the various components, the interface system may be attached under the console of the vehicle where it is hidden from sight. The system can be adapted to fit in all types of vehicles and is therefore considered a "universal" interface or universal system because it can interface with all types of OEMs including PETERBILT®, NAVISTAR®, VOLVO®, DAIMLER®, KENWORTH®, and the like. These are the four major OEMs that serve the semi-truck market in the US, but it should be appreciated that the system may work with all vehicles and all OEMs, not just semi-trucks. This is helpful achieve a universal interface. Furthermore, the system may adapt to a vertical controller area network (CAN) architecture of a vehicle making it compatible. Therefore, the software of the system may be configured with CAN architecture features.

As an example, when moving the vehicle autonomously, the AV system interacts with an engine control unit which controls the torque output of the engine and a transmission control unit which changes gears. Traditionally, the AV system of the vehicle provides a torque value to an engine control unit. In response, the engine control unit adjusts the torque output of the engine based on the torque command value. However, most OEM vehicles that are not specifically designed for autonomous driving have transmission controls units that are not designed to simply select a gear based on torque because other factors are needed such as gear ratio, pedal position, RPM, etc. Therefore, what usually happens is the transmission control unit goes through a tuning process where it guesses the best gear and continues to adjust the gears until the best gear is found to meet the requested torque. This process can take significant time. Furthermore, if the vehicle is going up a hill or performing other actions which cause a strain on the vehicle's movement, the tuning process can take even longer.

In the example embodiments, the interface system can translate values provided the vehicle computer (e.g., such as a torque value, a RPM value, and the like) into a pedal position value (e.g., a sensor reading output) that identifies an actual pedal position of the gas pedal as if the gas pedal were being pressed on by the foot of a driver. The system may store or otherwise access a table (e.g., a lookup table, etc.) which includes mappings of pedal position to torque values and/or RPM values. The table does not need every single possible combination of torque value, RPM value, and corresponding pedal position value. Instead, the system may interpolate torque values, RPM values, and pedal position values based on other known torque values, RPM values, and pedal position values stored in the table using a sparse map. Essentially, the system determines a pedal position value (e.g., a distance of movement/depression of the pedal) to achieve such torque at such an RPM. In response, the engine control unit and the transmission control unit can figure out the speed and the gear, almost immediately. Here, the engine control unit can use the torque value, the RPM value, and/or the pedal position value. Likewise, the transmission control unit can use the pedal position value. This process greatly reduces the traditional tuning process.

Every OEM does the same thing but may use different connectors and different communication protocols. In other words, every OEM essentially does the same pulse width modulation (PWM) control with the engine, they just change the voltage levels between PWM and analog values, and they change the connector. Here, the interface system can attach directly to the wires of the engine control unit and the AV system, and the system has a flexible input system that can handle any of these signals. For example, different resistors on a motherboard of the system may be used for the different OEMs (truck types). In this case, the board can be configured to use one of these resistors depending on the type of truck that the system is attached to. Furthermore, extra jumpers may be used to change the CAN bus feed and turn on and off CAN routing features. For the trucking industry, the system can be designed with four different versions of the same board with four different modifiable resistor modules for the four major OEMs. The interface system may receive CAN commands and apply a translation to the command to generate a signal to control a component of a vehicle such as an actuator, control unit, etc., and send the signal to the component. Furthermore, the interface system may receive a report back from the component acknowledge performance of the command. Here, the interface system can provide this report to other components of the vehicle, such as the vehicle's computer, to enable visibility of the command throughout the vehicle.

Controlling the throttle pedal position with the interface described in the previous chapters is a universal solution that works across different OEM platforms and avoids the drawbacks of sending direct torque commands to the engine over CAN bus. However, certain OEMs and powertrain suppliers have recently improved their firmware to avoid some of these drawbacks by implementing a specific control interface for autonomous driving systems. In these systems the response to torque commands is as fast or faster than pedal position commands but with less hardware required. If this firmware is present in the OEM vehicle, the interface components can be configured to send CAN commands directly to the powertrain components instead of modifying the accelerator pedal position.

FIG. 3A illustrates a diagram 300 of electrical connections between vehicle components in accordance with a related art. Referring to FIG. 3A, a vehicle may include physical input mechanisms within an interior 310 of the vehicle including an accelerator pedal 312, a brake pedal 314, and a stalk 316 which may be attached to a steering wheel (or underneath a steering wheel) and used to control headlights, turn signal indicators, cruise control, and the like. Each of the physical input mechanisms (e.g., the accelerator pedal 312, the brake pedal 314, the stalk 316, etc.) may be wired to one or more actuation systems such as control units of the vehicle, for example, an engine control unit, a transmission control unit, a CAN bus, and the like. Although not shown in FIG. 3A, other physical input mechanisms may also be present such as buttons for hazard lights, cruise control, etc. that can each be controlled.

In the example of FIG. 3A, a user may press on the accelerator pedal 312 (or the brake pedal 314) and a sensor attached to the accelerator pedal 312 may send actuating mechanisms 320 for actuating physical components of the vehicle such as the engine and the braking system (e.g., air brakes, etc.) The actuating mechanisms 320 may include an engine control unit, a transmission control unit, and a braking system control unit or actuator. The signal may include a displacement value that is measured by the sensor in response to the accelerator pedal 312 being depressed. In other words, the displacement value may represent an amount of distance that the accelerator pedal 312 has been depressed by the foot of the user/driver.

Figure 3B:
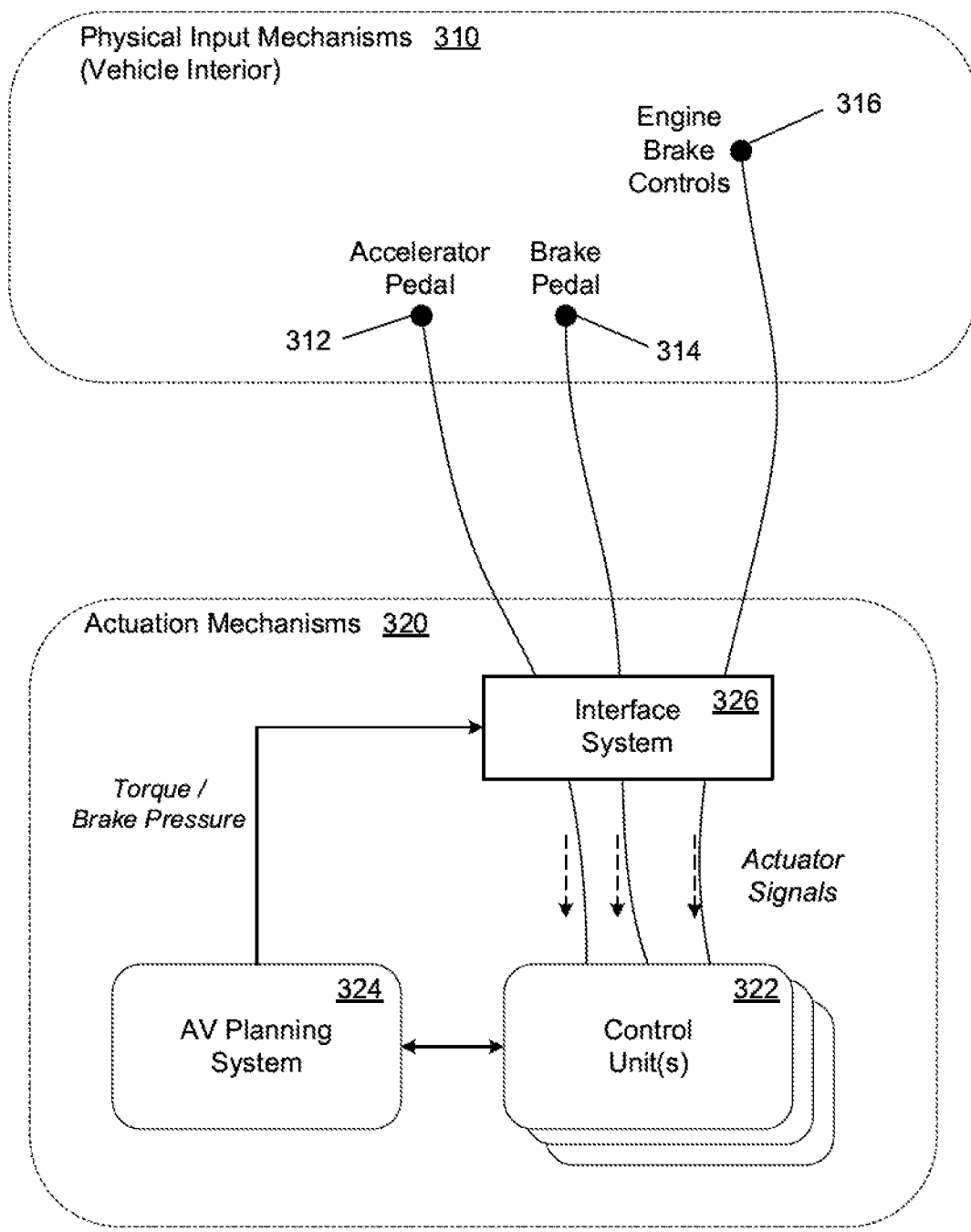
FIG. 3B is a diagram illustrating electrical connections between physical input components of a vehicle in accordance with an example embodiment.

FIG. 3B illustrates a diagram 330 of electrical connections between physical input components of a vehicle in accordance with an example embodiment. In this example, the actuating mechanisms 320 of the vehicle are modified to include an autonomous vehicle driving system according to various embodiments. In particular, the actuating mechanisms 320 include an autonomous vehicle (AV) system 324 and an interface system 326. The AV system 324 may include the acceleration control node of the example embodiments which is configured to generate an engine torque value or a brake pressure value in response to a request from the vehicle's computer to speed-up or slow down, respectively. The AV system 324 may create the trigger itself or it may receive it from another unit on the vehicle or a remote server. The AV system 324 may include one or more input ports for electrically connecting to the vehicle's computer and other components. The AV system 324 may also include output ports for electrically connecting to the interface system 326, for example, via wiring harnesses, etc.

When the interface system 326 receives the engine torque value or the brake pressure value from the AV system 324, the interface system 326 translates the value (and possible other values such as RPM, etc.) into an actuation signal for triggering actuation of the engine or the braking system in accordance with the translated values. The interface system 326 may use a translation table which converts the engine torque value (and RPM value) into a pedal position displacement value that mimics a displacement of the accelerator pedal 312 when depressed by a user's foot. In this case though, the actuating signal is originating from the AV system 324, not the accelerator pedal 312. In response, the interface system 326 may send the actuating signal to a control unit 322 such as an engine control unit and/or a transmission control unit which then change speeds (and possibly gears) based on the pedal position displacement value. Although not shown in FIG. 3B, the interface system 326 may shut off or switch off the electrical connection with the accelerator pedal 312 in response to the signal being received from the AV system 324.

If, on the other hand, the AV system 324 sends a brake pressure value to the interface system 326, the interface system may transmit the brake pressure command to a brake actuation system which will trigger the braking system to apply braking force to the wheels of the vehicle. The interface system 326 and the brake actuation system may be connected to the vehicle in such way that the OEM vehicle will sense the braking pressure as if it was originating from the brake pedal 314 even though it is from the AV system 324.

The AV system 400 according to various embodiments is integrated into the vehicle. For example, the AV system 400 may be attached to or otherwise installed in connection the wiring between the physical input mechanisms and the control units 322. Here, the AV system 400 may include interfaces for receiving wire harnesses from each of the accelerator pedal 312, the brake pedal 314, and the stalk 316, as well as the sensors that are attached thereto. It should also be appreciated in these examples that the brake pedal 314 may refer to a brake actuation system (e.g., air brakes, etc.) which can convert compressed air force within a truck's air reservoir into mechanical force that can be used to actuate the brakes. In this case, the interface system 326 may be used to block signals from the different physical input mechanisms (e.g., using relays, gates, switches, etc. inside the AV system 400), and generate control signals which appear as if they are coming from the physical input mechanisms (e.g., the accelerator pedal 312, the brake pedal 314, and the stalk 316).

The control signals may imitate or otherwise match the signals that would be sent from the physical input mechanisms. However, rather than require a user to press or otherwise interact with the physical input mechanisms, the control signals may be triggered by a command or a request from the vehicle's computer such as an AV system 324. The control signals may be received by the control units 322 and be processed as if they were coming from the actual physical input mechanisms. Thus, the vehicle's computer can control the physical input mechanisms (e.g., the gas pedal 312, the brake pedal 314, the stalk 316, etc.) as if a human were present in the interior 310 of the vehicle. Meanwhile, the control units 322 are unaware that the control signals are not from a human interacting with the physical input mechanisms. In addition, the vehicle's computer may utilize control interfaces that are specifically designed as mechanisms for autonomous driving systems to command the OEM vehicle systems. Such interfaces may include sending torque commands directly to the engine and transmission units over CAN bus from with a feature that tells the units that the messages originate from an autonomous driving system.

Figure 4:
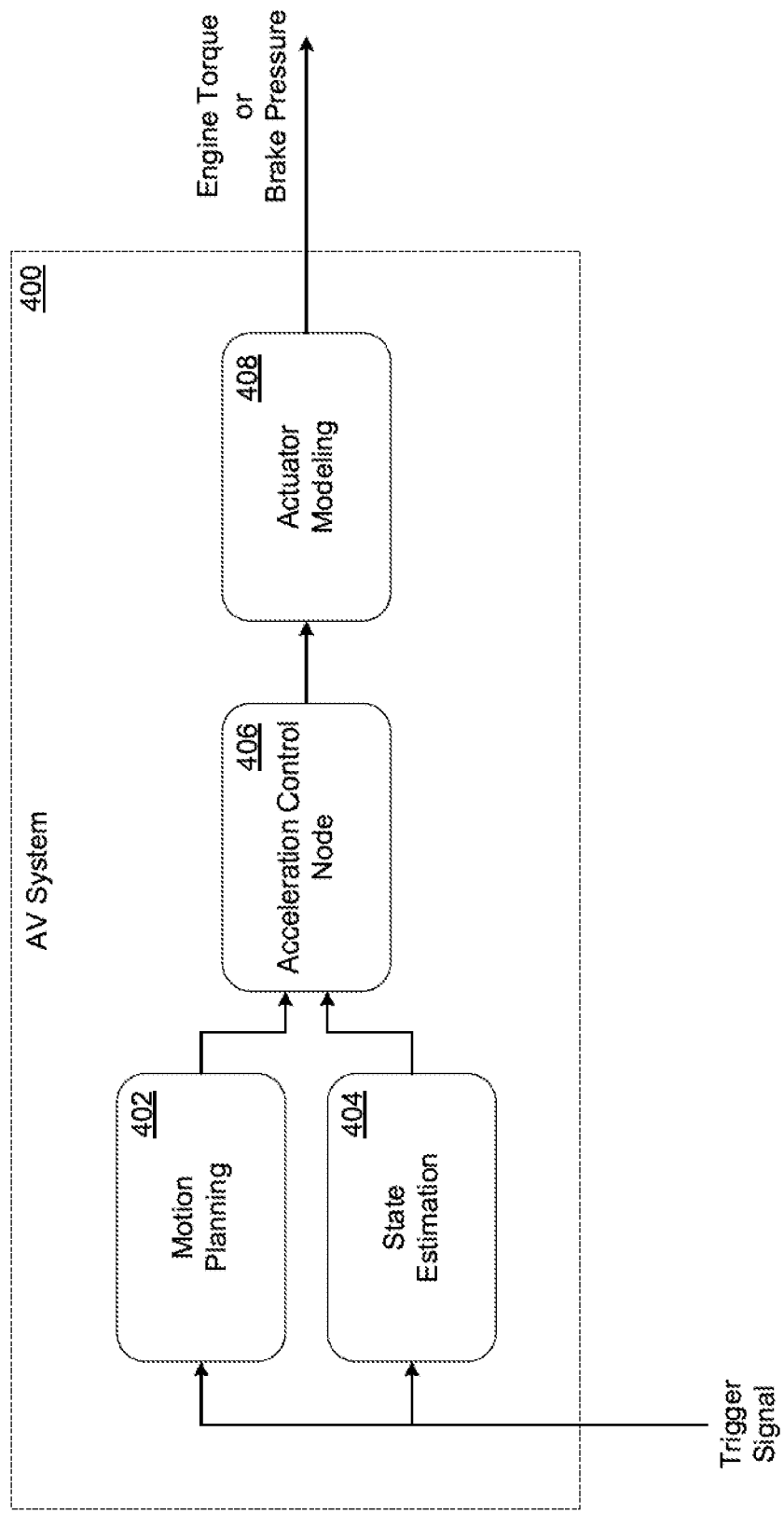
FIG. 4 is a diagram illustrating an AV system for generating an actuation signal for a physical input component of a vehicle in accordance with an example embodiment.

FIG. 4 illustrates an AV system 400 for automatically driving an autonomous vehicle. In this example, the AV system 400 can generate an actuation signal for a physical input component of a vehicle in accordance with an example embodiment. Referring to FIG. 4, the AV system 400 may be the AV system 324 shown in FIG. 3B that is used for planning and route guidance. In this example, the AV system 400 includes a motion planning system 402 configured to generate a route or path for the vehicle, and a state estimation system 404 configured to capture sensor data such as radar, lidar, images, etc. and estimate various attributes of the vehicle such as its pose, its speed, other objects/vehicles in the road, current lane of the vehicle, etc.

In the example embodiments, the motion planning system 402 can generate and send a desired acceleration value to the acceleration control node 406. The state estimation system 404 can generate and send a state estimation signal to the acceleration control node 406 that includes one or more values for current vehicle speed, current lane, vehicle data of surrounding vehicles, other objects in the road, etc. The motion planning system 402 and the state estimation system 404 can be triggered to send their data by a signal from the AV system 400 itself or from another system outside the AV system. In response, the acceleration control node 406 may call an actuator modeling system 408 which uses a physics-based model to convert the state of the vehicle and the acceleration value into one of an engine torque value and a brake pressure value that is then output and sent to the interface system 326 shown in FIG. 3B. In this context the engine torque value may mean either an actual torque signal sent directly to the engine or an accelerator pedal position which the engine will interpret to mean a similar torque value based on the engine calibration. Furthermore, braking value may mean either a brake pressure value or an engine brake torque value.

Figure 5B:
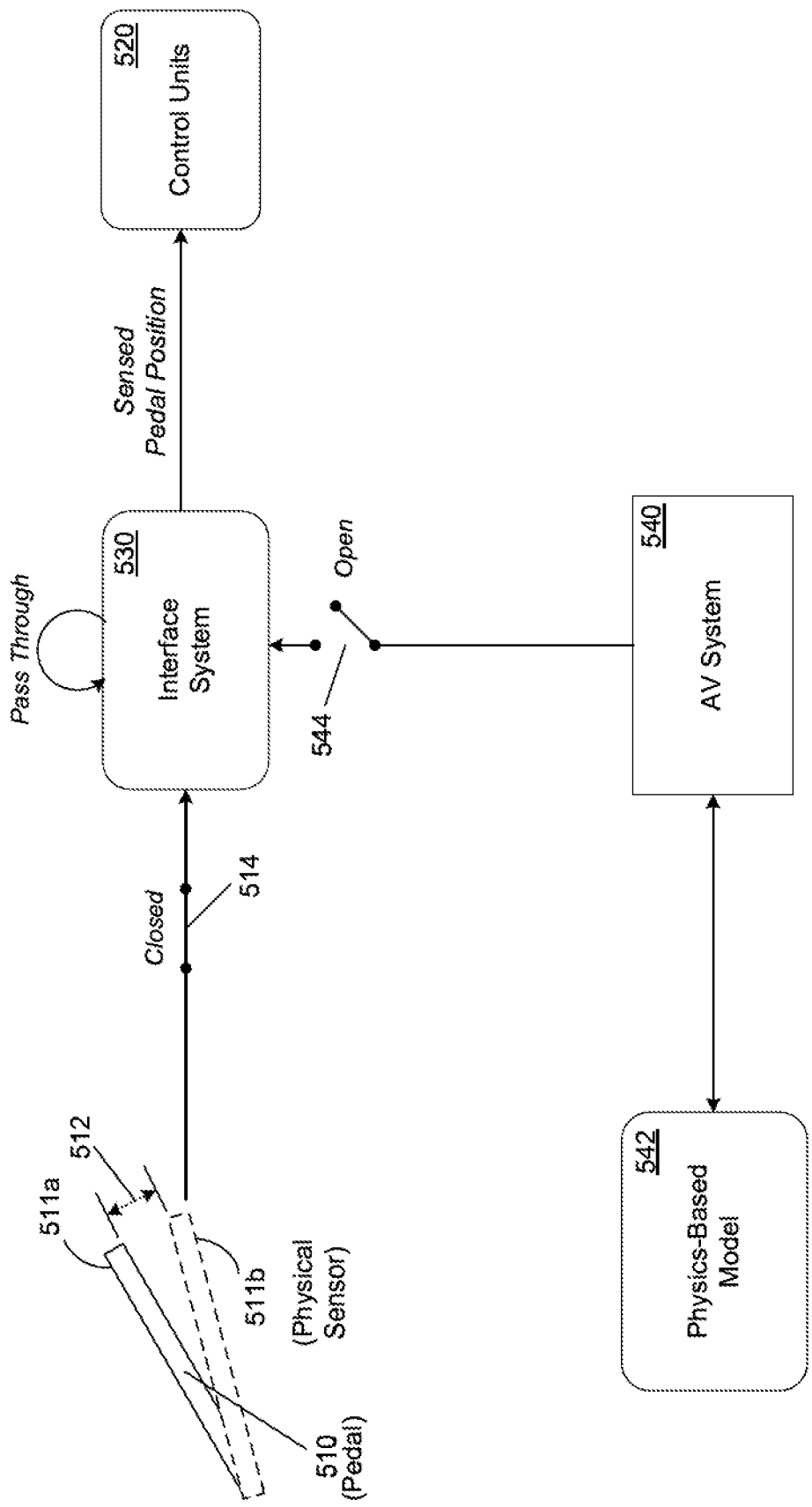
Figure 5C:
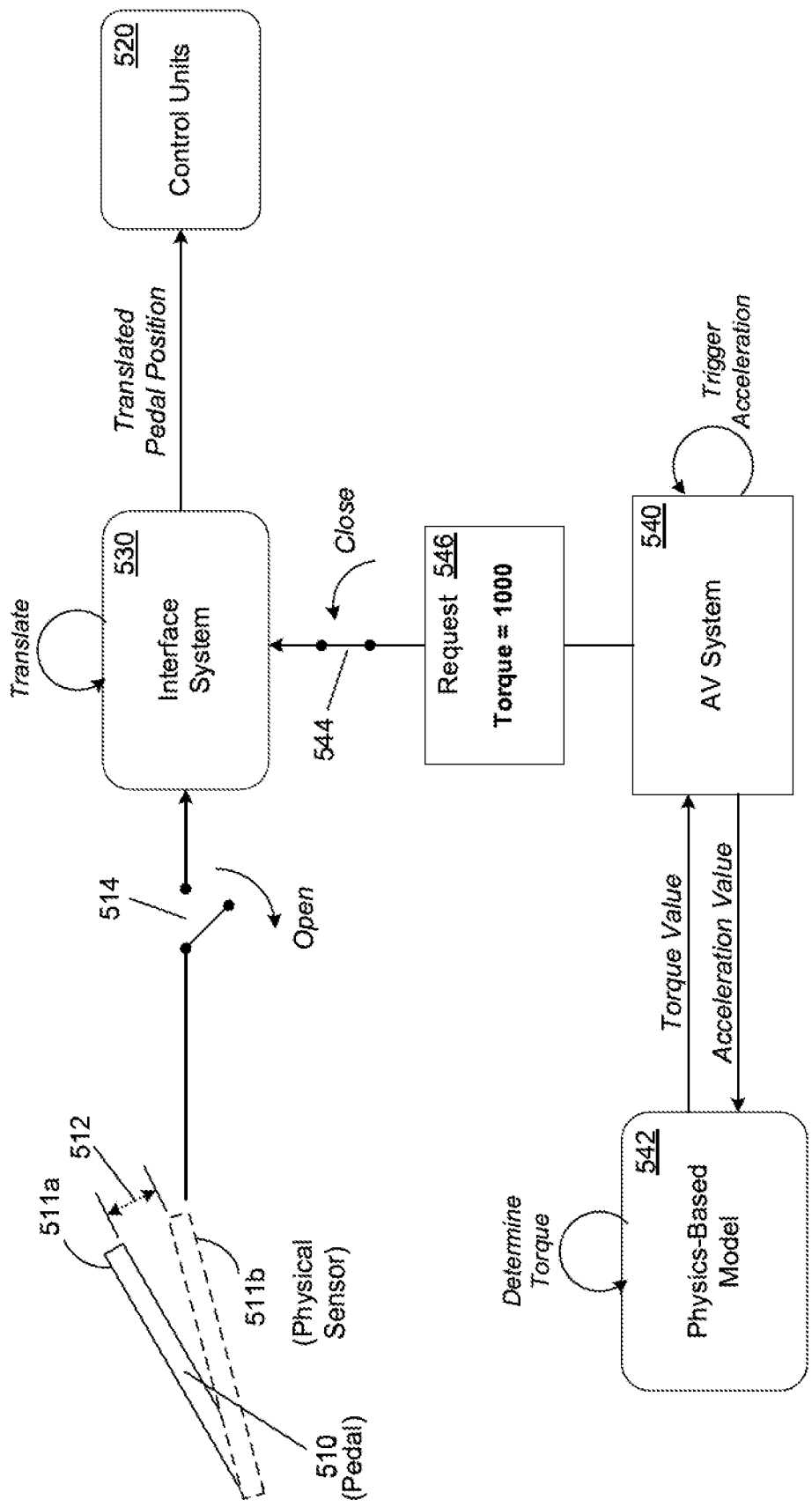

FIGS. 5A-5C illustrate processes for controlling a physical input of an engine 522 or a braking system 524 of a vehicle in accordance with an example embodiment. In some embodiments, both the engine 522 and the braking system 524 may be controlled or just one of the systems may be controlled. In particular, FIG. 5A illustrates a process 500 of a control signal being generated by an accelerator pedal 510 of a vehicle being depressed by the foot of a driver. When pressed, the accelerator pedal sends a signal to the control units to increase the speed of the engine. In this example, the AV system and the interface system described previously are not embodied within the vehicle or they are not being used. Here, the accelerator pedal 510 may refer to an acceleration pedal, a brake pedal, or the like.

In the example of FIG. 5A, the accelerator pedal 510 has a starting place 511a before the physical input and a finishing place 511b (displaced location) after the physical input. In response, a pedal sensor 512 measures the difference between the starting place 511a and the finishing place 511b of the accelerator pedal 510 to determine a displacement value of the pedal, and sends a control signal with the displacement value to a control unit(s) 520 such as an engine control unit, a transmission control unit, a braking system control unit, a combination thereof, or the like, which generate actuation signals for driving the engine 522 and the braking system 524 of the vehicle.

As an example, the control unit 520 may include an engine control unit and a transmission control unit which are configured to command the engine 522 to accelerate when the pedal position value (or other value) received from the sensor indicates that the vehicle should increase speed. As another example, the control unit 520 may include a torque retarder/engine retarder within or otherwise coupled to the engine 522. The torque retard may have its own ECU. In semi-trucks, the torque retarder is often referred to as a "Jake Brake". The engine retarder may use a negative torque command to alter the operation of the engine so that the engine works as a power-absorbing component (e.g., it adds a load/friction to the engine 522 that slows down the vehicle, et.). In some cases, the engine retarder may be used on long downhills or the like, where the braking system is not needed but rather deceleration of the engine is enough to slow down the vehicle in time. It does not access the brake pads and control the braking system.

FIG. 5B illustrates a process 550 of a vehicle which includes an autonomous vehicle system (AV system 540) and an interface system 530. In this case, the AV system 540 also includes an acceleration control node with a physics-based model to interpret acceleration and state values from the vehicle's computer into engine torque values or brake value to be used to actuate an engine or a braking system of the vehicle. In this case, the acceleration control node may be a software program installed within the AV system 540 that determines the torque value or the braking value. However, in this case, the AV system 540 is switched off by opening a switch 544 between the AV system 540 and the interface system 530.

Meanwhile, a switch 514 between the pedal sensor 512 and the interface system 530 is closed/enabled. In this scenario, the interface system 530 will receive a pedal displacement value/reading from the pedal sensor 512 and allow it to pass through to the control unit(s) 520. In other words, even with the AV system 540 and the interface system 530 included within the vehicle, the vehicle can still operate under its normal acceleration and deceleration operations.

FIG. 5C illustrates a process 560 in which the interface system 530 closes the switch 544 between the AV system 540 and the interface system 530, and opens the switch 514 between the pedal sensor 512 and the interface system 530. In doing so, the interface system 530 enables the AV system 540 to control the vehicle's movements and route/path of travel. In this example, the AV system 540 (e.g., the acceleration control node 406, etc.) may interact with a physics-based model 542 to create an input signal that can be interpreted by the interface system 530. For example, the physics-based model may determine an engine torque value or a braking value based on the model. A request 546 with the engine torque value or braking value generated by the physics-based model 542 may be transmitted from the AV system 540 to the interface system 530. The request 546 may include other data attributes created by the AV system 540 such as the RPM. In response, the interface system 530 may translate the values within the request 546 into a pedal displacement value such as a displacement value for an accelerator pedal (speed up) or a brake pressure value for a brake actuation system (slow down). To do this, the interface system 530 may store or otherwise access a translation table which maps Torque/RPM combinations to pedal displacement measurements.

Meanwhile, the interface system 530 may establish a pulse width modulation (PWM) signal or signals between the AV system 540 and the control units 520 such as an engine control unit and a transmission control unit. Here, the interface system 530 may receive the request 546 from the AV system 540 and generate a control signal which imitates a signal from the accelerator pedal 510 and transmit the control signal to the control unit(s) 520. In response, the control unit(s) may control actuators associated with the engine or the braking system to speed up the vehicle (increasing the output torque of the engine) or slow down the vehicle (apply/actuate the brakes).

When a user commands the accelerator pedal 510, the user may use their foot to press on the accelerator pedal 510 causing a change in pedal position from the starting place 511a to the finishing place 511b. This change in pedal position can be sensed by one or more sensors (not shown) and transmitted to the engine control unit. In contrast, in the example of FIG. 5C, the vehicle's computer system including the AV system 540 and the interface system 530 can create a signal that mimics the sensor signal. Thus, the control unit(s) 520 is unaware of whether the signal is coming from the pedal sensor 512 or from the AV system 540.

Although not shown in FIG. 5C, the engine 522 may include a kill switch or something similar capable of receiving a kill signal, also referred to herein as an estop signal, from the vehicle computer. In response, the interface system 530 may use the switch 544 or other relay to disable the connection between the AV system 540 and the control unit(s) 520 and enable the connection from the pedal sensor 512 to the control unit(s) 520.

Figure 6B:
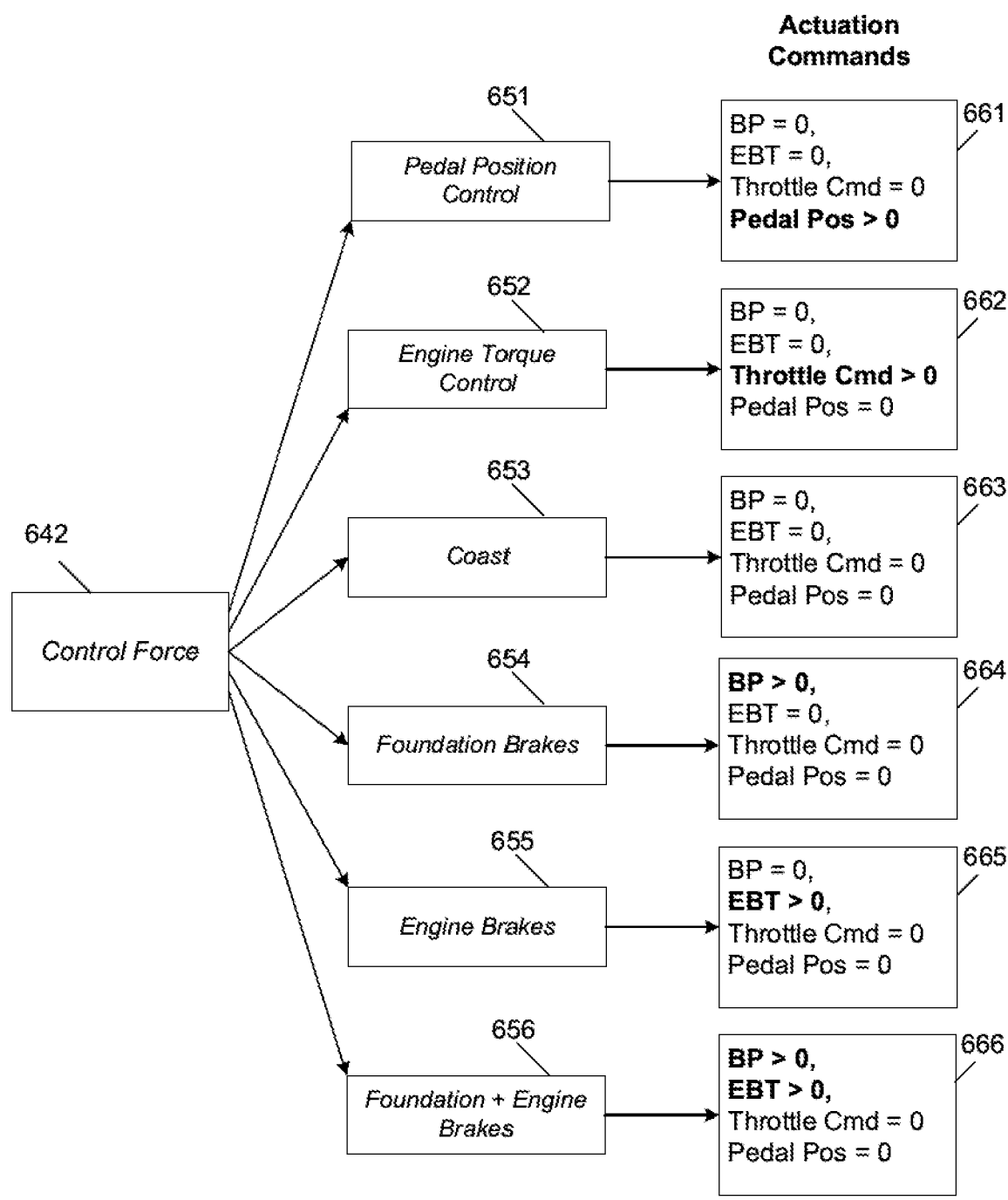
FIG. 6B is a diagram illustrating an example of the logic performed by the acceleration control node to generate an actuation command in accordance with an example embodiment.

FIG. 6A illustrates a process 600 of an acceleration control node 620 generating an actuation signal for controlling acceleration of a vehicle in accordance with an example embodiment, and FIG. 6B illustrates an example of the logic used by the acceleration control node to model an actuation command for a control unit on the vehicle such as an engine control unit, a transmission control unit, a jake brake, and the like, in accordance with an example embodiment. In particular, FIG. 6A illustrates a process of the acceleration control node 620 which may correspond to the acceleration control node 406 in FIG. 4. In this example, the acceleration control node 620 may be installed within or otherwise coupled to the AV system 540 shown in FIG. 5C.

Referring to FIG. 6A, the acceleration control node 620 includes a control force generator 622 and an actuator command generator 624. These models can determine the necessary force to arrive at the desired acceleration (control force generator 622) and convert the force into an appropriate actuation signal to cause the vehicle to achieve such a force (actuator command generator 624). For example, the acceleration control node 620 may receive a requested acceleration value from a motion planning system 610 that may be included within the AV system or other system of the vehicle. The acceleration value may be a desired value to be obtained by the vehicle and it may be different than a current speed/acceleration of the vehicle.

The acceleration control node 620 may obtain various state information of the vehicle in order to make a decision on how to handle the requested acceleration from the motion planning system 610. For example, a state measurement node 612 may obtain various settings and features of the vehicle such as a current gear in which the engine/transmission is traveling, a maximum available engine torque available to increase acceleration, a maximum available retarding torque available to decelerate the engine, an engine speed, and the like. In addition, or instead of, the acceleration control node 620 may also obtain estimated state values of the vehicle such as an estimated mass, speed, drag, pitch, roll resistance forces, engine friction forces, maximum traction force, wheel radius diameter, driveline efficiency, applied engine braking force, mass factor, pitch, and the like. Furthermore, the acceleration control node 620 may also receive a vehicle configuration data such as the braking system characteristics and the throttle pedal characteristics of the vehicle.

As shown in FIG. 6A, the control force generator 622 receives the acceleration value from the motion planning system 610 while the actuator command generator 624 receives the vehicle configuration data 616. Meanwhile, both the control force generator 622 and the actuator command generator 624 receive the measured state from the state measurement node 612 and the estimated state from the state estimation node 614. In response, the control force generator 622 may determine an appropriate force necessary, based on the state of the vehicle, to control the vehicle to reach the desired acceleration value. For example, the control force generator 622 may use one or more physics-based models to generate the control force value. The control force generator 622 may output the control force value and input it to the actuator command generator 624. In response, the actuator command generator 624 may generate a control signal such as an actuation command for controlling an actuator of the vehicle such as an engine control unit, a braking control unit, a throttle control unit, and the like. Furthermore, the actuator command generator 624 may output the actuation command to an interface system 630 which translates the command into an actuation signal that is then sent to the corresponding actuator.

An example of the logic embodied within the actuator command generator 624 is shown and further described in FIG. 6B. Referring to FIG. 6B, a process 640 of converting a control force value 642 into an actuator command 661, 662, 663, 664, 665, or 666 is illustrated. In this example, the actuator command generator may receive the control force value 642, which may be number, and compare it to one or more thresholds such as a maximum coast threshold.

For example, if the control force is greater than the maximum coast threshold, the vehicle needs to speed. Here, the actuator command generator 624 may generate either a pedal position control signal 651 to control the engine by adjusting the accelerator pedal position or it may generate an engine torque control signal 652 to control the engine directly with torque commands over CAN bus. An example of the pedal position control signal 651 is shown in the actuator command 661. Here, the control signal includes a pedal position command without modifying the brake pressure (BP), engine brake torque (EBT), or the throttle. Meanwhile, an example of the engine torque control signal 652 is shown in the actuator command 662. In this example, the actuator command 662 adjusts the engine throttle value to increase the engine speed based on torque instead of pedal position. The decision of whether to use the pedal position control signal 651 or the engine torque control signal 652 is done based on which method is best supported by the engine type of the OEM vehicle.

As another example, the logic may determine a coasting control signal 653 (not speed up or slow down) if the control force value 642 is less than the maximum coast threshold but greater than a minimum coasting threshold value. An example of such a coasting control signal is shown in the actuator command 663 which does not modify any of the actuators (all the values are zero). As another example, if the logic determines that the control force value 642 is below the minimum coasting threshold, the actuator command generator 624 may determine to apply braking in some way. There are different possible control signals for braking such as foundation braking control signal 654, engine braking control signal 655, or a combination of both 656. Furthermore, the corresponding actuator commands 664, 665, and 666 for controlling foundation braking control signal 654, the engine braking control signal 655, and both 656, respectively, is shown.

FIG. 7 illustrates a method 700 for controlling actuation of a physical input mechanism of a vehicle in accordance with an example embodiment. As an example, the method 700 may be performed by an acceleration control node that may be implemented within an AV system of an autonomous vehicle, or the like. Referring to FIG. 7, in 710, the method may include receiving an acceleration value from a planning system of a vehicle and a state of the vehicle from a state estimation system.

As an example, the acceleration value may be a positive acceleration value (e.g., increase speed) or a negative acceleration value (e.g., decrease speed). The state of the vehicle may include both data read from the vehicle's on-board systems such as a current gear of the transmission system, an available engine torque, an available retarder torque, an engine speed, and the like. As another example, or in addition, the state of the vehicle may be provided by an estimation node that may estimate features such as mass, speed, drag, roll, pitch, engine friction, maximum traction, wheel radius, driveline efficiency, applied engine brake force, mass factor, and the like.

In 720, the method may include converting the acceleration value and the state of the vehicle into at least one of an engine torque value and a braking value. In 730, the method may include generating a control signal for controlling a speed of the vehicle based on the at least one of the engine torque value and the braking value. Furthermore, in 740, the method may include transmitting the control signal to a control system of the vehicle.

In some embodiments, the converting may include converting the acceleration value and the state of the vehicle into the engine torque value, and the generating comprises generating a control signal to control an actuator of the vehicle. In some embodiments, the transmitting may include transmitting the control signal to an engine control unit via a gateway interface which is configured to translate the engine torque value into a pedal position displacement value. In some embodiments, the transmitting may include transmitting the control signal to an engine control unit directly as an engine torque command without converting the command to a pedal position.

In some embodiments, the converting comprises converting the acceleration value and the state of the vehicle into the braking value, and the generating comprises generating a control signal to control an actuator of the vehicle to apply a pressure in the braking system which will activate the brake pads at the wheel at a desired force. In some embodiments, the conversion may include converting the acceleration value and the state of the vehicle into a braking force, and generating a control signal to control an actuator of the vehicle to apply a retarding action to the vehicle's drive wheels to slow down the vehicle without using the service brakes.

In some embodiments, the receiving the state of the vehicle may include reading one or more of a current gear of the vehicle, a max available engine torque, a max available retarder torque, and an engine speed, from systems on the vehicle. In some embodiments, the receiving the state of the vehicle may include receiving one or more of a current mass of the vehicle, a current speed of the vehicle, a current pitch, and a wheel radius of wheels on the vehicle, estimated by an estimation node of the vehicle. In some embodiments, the generating may include converting the acceleration value and the state of the vehicle into a control force, and the generating comprises generating an actuation command comprising at least one of a brake pressure command, an engine brake command, an accelerator pedal position command or an engine torque command, based on an actuator model and the control force. In some embodiments, the transmitting comprises transmitting the actuation command to at least one of a transmission control unit, an engine control unit, a brake control unit, and a torque retarder.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. An apparatus comprising:
 a processor configured to:
  receive an acceleration value from a planning system of a vehicle and a current state of movement of the vehicle from a state estimation system;
  determine a specified amount of force to apply to achieve the acceleration value based on execution of a physics-based model on the current state of movement of the vehicle and the acceleration value;
  determine, based on the determined amount of force, a type of force to apply to the vehicle from among a plurality of types of force;
  generate a control signal to change a speed of the vehicle based on the determined amount of force and the determined type of force, wherein the generating comprises converting the acceleration value and the current state of the vehicle into a control force, and generating an actuation command comprising at least one of a brake pressure command, an engine brake command, an accelerator pedal position command, and an engine torque command based on an actuator model and the control force; and actuate one or more of an engine of the vehicle and a braking system of the vehicle to change the speed of the vehicle based on the generated control signal.

2. The apparatus of claim 1, wherein the processor is configured to convert the acceleration value and the current state of the vehicle into an engine torque value, and generate the control signal to control an actuator of the vehicle to adjust a torque output of the engine based on the engine torque value.

3. The apparatus of claim 2, wherein the processor is configured to transmit the control signal to an engine control unit via a gateway interface which is configured to at least one of sending a torque command directly to the engine and translating the engine torque value into a pedal position displacement value.

4. The apparatus of claim 1, wherein the processor is configured to convert the acceleration value and the state of the vehicle into a braking value, and generate a control signal to control an actuator of the vehicle to activate at least one of a service brake system and an engine retarder of the vehicle based on the braking value.

5. The apparatus of claim 1, wherein the processor is configured to convert the acceleration value and the current state of the vehicle into a braking value, and generate a control signal to control an actuator of the vehicle to reduce an acceleration of an engine of the vehicle based on the braking value.

6. The apparatus of claim 1, wherein the current state of the vehicle comprises one or more of a current gear of the vehicle, a current gear ratio of a transmission, a max available engine torque, a max available retarder torque, and an engine speed, which are read from systems on the vehicle.

7. The apparatus of claim 1, wherein the current state of the vehicle comprises one or more of a current mass of the vehicle, a current speed of the vehicle, a current acceleration of the vehicle, a value based on drag and friction forces affecting the vehicle, a current pitch of the vehicle, and a wheel radius of wheels on the vehicle, estimated by an estimation node of the vehicle.

8. The apparatus of claim 1, wherein the processor is configured to output the actuation command to at least one of a brake unit, a transmission control unit, an engine control unit, and an engine retarder.

9. A method comprising:
receiving an acceleration value from a planning system of a vehicle and a current state of movement of the vehicle from a state estimation system;
determining a specified amount of force needed by the moving vehicle to achieve the acceleration value based on execution of a physics-based model on the current state of movement of the vehicle and the acceleration value;
determining, based on the determined amount of force, a type of force to apply to the vehicle from among a plurality of types of force based on the determined amount of force;
generating a control signal for changing a speed of the vehicle based on the determined amount of force and the determined type of force, wherein the generating comprises converting the acceleration value and the current state of the vehicle into a control force, and generating an actuation command comprising at least one of a brake pressure command, an engine brake command, an accelerator pedal position command, and an engine torque command based on an actuator model and the control force; and actuating one or more of an engine of the vehicle and a braking system of the vehicle to change the speed of the vehicle based on the generated control signal.

10. The method of claim 9, wherein the converting comprises converting the acceleration value and the current state of the vehicle into an engine torque value, and the generating comprises generating a control signal to control an actuator of the vehicle to adjust a torque output of the engine based on the engine torque value.

11. The method of claim 10, wherein the transmitting comprises transmitting the control signal to an engine control unit via a gateway interface which is configured to at least one of sending a torque command directly to the engine and translating the engine torque value into a pedal position displacement value.

12. The method of claim 9, wherein the converting comprises converting the acceleration value and the current state of the vehicle into a braking value, and the generating comprises generating a control signal to control an actuator of the vehicle to activate at least one of a service brake system and an engine retarder of the vehicle based on the braking value.

13. The method of claim 9, wherein the converting comprises converting the acceleration value and the current state of the vehicle into a braking value, and generating a control signal to control an actuator of the vehicle to reduce an acceleration of an engine of the vehicle based on the braking value.

14. The method of claim 9, wherein the current state of the vehicle comprises one or more of a current gear of the vehicle, a current gear ratio of a transmission, a max available engine torque, a max available retarder torque, and an engine speed, which are read from systems on the vehicle.

15. The method of claim 9, wherein the current state of the vehicle comprises one or more of a current mass of the vehicle, a current speed of the vehicle, a current acceleration of the vehicle, a value based on drag and friction forces affecting the vehicle, a current pitch of the vehicle, and a wheel radius of wheels on the vehicle, estimated by an estimation node of the vehicle.

16. The method of claim 9, wherein the transmitting comprises transmitting the actuation command to at least one of a brake control unit, a transmission control unit, an engine control unit, and an engine retarder.

17. A non-transitory computer-readable medium comprising instructions which when executed by a processor cause a computer to perform a method comprising:
receiving an acceleration value from a planning system of a moving vehicle and a current state of movement of the vehicle from a state estimation system;
determining a specified amount of force needed by the vehicle to achieve the acceleration value based on execution of a physics-based model on the current state of movement of the vehicle and the acceleration value;
determining, based on the determined amount of force, a type of force to apply to the vehicle from among a plurality of types of force;
generating a control signal for changing a speed of the vehicle based on the determined amount of force and the determined type of force, wherein the generating comprises converting the acceleration value and the current state of the vehicle into a control force, and generating an actuation command comprising at least one of a brake pressure command, an engine brake command, an accelerator pedal position command, and an engine torque command based on an actuator model and the control force; and actuating one or more of an engine of the vehicle and a braking system of the vehicle based on the generated control signal.

18. The non-transitory computer-readable medium of claim 17, wherein the converting comprises converting the acceleration value and the current state of the vehicle into a control force, and the generating comprises generating an actuation command comprising at least one of a brake pressure command, an engine brake command, and an engine.

* * * * *